United States Patent
Tavares et al.

(10) Patent No.: US 9,508,108 B1
(45) Date of Patent: Nov. 29, 2016

(54) HARDWARE-ACCELERATED GRAPHICS FOR USER INTERFACE ELEMENTS IN WEB APPLICATIONS

(75) Inventors: Gregg Tavares, San Francisco, CA (US); Matthew Papakipos, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1460 days.

(21) Appl. No.: 12/267,141

(22) Filed: Nov. 7, 2008

(51) Int. Cl.
*G06T 1/00* (2006.01)
*G06T 15/00* (2011.01)

(52) U.S. Cl.
CPC *G06T 1/00* (2013.01); *G06T 15/00* (2013.01)

(58) Field of Classification Search
None
See application file for complete search history.

(56) References Cited

U.S. PATENT DOCUMENTS

| | | | | |
|---|---|---|---|---|
| 7,626,537 | B2* | 12/2009 | Andrusiak et al. | 342/177 |
| 2003/0126311 | A1* | 7/2003 | Kushnirskiy | G06F 9/443 719/328 |
| 2006/0114260 | A1* | 6/2006 | Diard | 345/505 |
| 2007/0244990 | A1* | 10/2007 | Wells | 709/218 |
| 2008/0104195 | A1* | 5/2008 | Hawkins et al. | 709/217 |
| 2009/0122062 | A1* | 5/2009 | Kilpatrick | G06T 15/80 345/426 |

\* cited by examiner

*Primary Examiner* — Michelle Chin
(74) *Attorney, Agent, or Firm* — McDermott Will & Emery LLP (57) ABSTRACT

Some embodiments provide a system that renders a user interface (UI) element for a web application. During operation, the system loads the web application in a web browser and obtains a rendering request for the UI element from the web application. Next, the system generates a graphics-processing unit (GPU) command stream corresponding to the UI element based on the rendering request. Finally, the system sends the GPU command stream to a GPU, where the UI element is rendered by the GPU.

25 Claims, 6 Drawing Sheets

HARDWARE-ACCELERATED GRAPHICS FOR USER INTERFACE ELEMENTS IN WEB APPLICATIONS

RELATED APPLICATION

The subject matter of this application is related to the subject matter in a co-pending non-provisional application by inventors Antoine Labour and Matthew Papakipos and filed on the same day as the instant application entitled, "Hardware-Accelerated Graphics for Web Applications Using Native Code Modules," having Ser. No. 12/267,095, and filed 7 Nov. 2008.

The subject matter of this application is also related to the subject matter in a co-pending non-provisional application by inventor Antoine Labour and filed on the same day as the instant application entitled, "Command Buffers for Web-Based Graphics Rendering," having Ser. No. 12/267,125, and filed 7 Nov. 2008.

The subject matter of this application is also related to the subject matter in a co-pending non-provisional application by inventors Robin Green, Evangelos Kokkevis, Matthew Papakipos and Gregg Tavares and filed 16 Jul. 2008 entitled, "Web-Based Graphics Rendering System," having Ser. No. 12/174,586.

BACKGROUND

1. Field

The present embodiments relate to graphics rendering techniques. More specifically, the present embodiments relate to platform-independent techniques for rendering user interface elements in web applications using hardware-accelerated graphics.

2. Related Art

Computer systems often include a number of native applications that require complex three-dimensional (3D) scenes to be rendered, such as computer games and computer-aided design (CAD) systems. To render 3D scenes, these native applications may use graphics application programming interfaces (APIs) that direct calculations related to graphics rendering to dedicated graphics processing units (GPUs). The additional computational power provided by these GPUs can greatly improve graphics quality and throughput.

The computational power of GPUs may also be used to render user interface (UI) elements in native applications. In particular, native applications may utilize graphics hardware acceleration to render UI elements such as text, windows, menus, icons, buttons, scrollbars, and/or toolbars. Furthermore, the graphics hardware acceleration may allow the native applications to implement UI features such as two-dimensional (2D) and 3D UI elements, anti-aliasing, vector graphics, overlay of 2D content on 3D surfaces, animation, geometric transformations, and/or hardware-accelerated text rendering.

Web applications, which have become more prevalent in recent years, are typically written in scripting languages that are unable to utilize low-level graphics APIs that provide graphics hardware acceleration. Instead, graphics rendering for web applications is typically performed by CPUs instead of GPUs. The software-based nature of web-based graphics rendering may thus limit the graphics capabilities of web applications in both 2D and 3D rendering. However, unlike native applications, web applications provide a number of advantages. For example, web applications are capable of executing on multiple platforms, do not require installation, and can be more secure than native applications.

Hence, what is needed is a platform-independent, web-based graphics rendering system that enables graphics hardware acceleration for web applications.

SUMMARY

Some embodiments provide a system that renders a user interface (UI) element for a web application. During operation, the system loads the web application in a web browser and obtains a rendering request for the UI element from the web application. Next, the system generates a graphics-processing unit (GPU) command stream corresponding to the UI element based on the rendering request. Finally, the system sends the GPU command stream to a GPU, where the UI element is rendered by the GPU.

In some embodiments, the system also displays the UI element within the web browser.

In some embodiments, the system also obtains an updated rendering request for the UI element from the web application. In these embodiments, the system updates the GPU command stream based on the updated rendering request and sends the updated GPU command stream to the GPU, where the UI element is re-rendered by the GPU.

In some embodiments, the UI element is re-rendered to animate the UI element, transform the UI element, or change the dimensionality of the UI element.

In some embodiments, the GPU command stream is generated and sent to the GPU by a plugin associated with the web browser.

In some embodiments, the plugin is configured to generate the GPU command stream using at least one of a scenegraph renderer, a command buffer, a native code module, a trusted code module, and a rendering engine.

In some embodiments, the UI element is at least one of a scrollbar, a textbox, text, a button, a checkbox, a radio button, a menu, a window, an icon, a cursor, a form field, and a toolbar.

In some embodiments, the web application is implemented using at least one of a scripting language and a native code module.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present embodiments. Thus, the system is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing computer-readable media now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Embodiments provide a method and system for executing a web application. The web application may be loaded in a web browser and executed on a computing system such as a personal computer (PC), a mobile phone, a personal digital assistant (PDA), a graphing calculator, a portable media player, a global positioning system (GPS) receiver, and/or another electronic computing device. The web application may be obtained by the computing system from a server using a network connection with the server. For example, the web application may be downloaded over the Internet from a website.

More specifically, embodiments provide a method and system for rendering graphics for the web application, including user interface (UI) elements in the web application. UI elements may include, for example, scrollbars, textboxes, text, buttons, checkboxes, radio buttons, menus, windows, icons, cursors, form fields, toolbars, and/or other components for facilitating user interaction. To render a UI element, a plugin associated with the web browser may receive a rendering request for the UI element from the web application. The plugin may then generate a graphics-processing unit (GPU) command stream corresponding to the UI element based on the rendering request and send the GPU command stream to a GPU on the computing system. The GPU may then render the UI element by executing the GPU command stream. Finally, the UI element may be displayed within the web browser to facilitate user interaction with the web application. Consequently, embodiments may allow platform-independent web applications to utilize graphics hardware acceleration in rendering UI elements.

Figure 1:
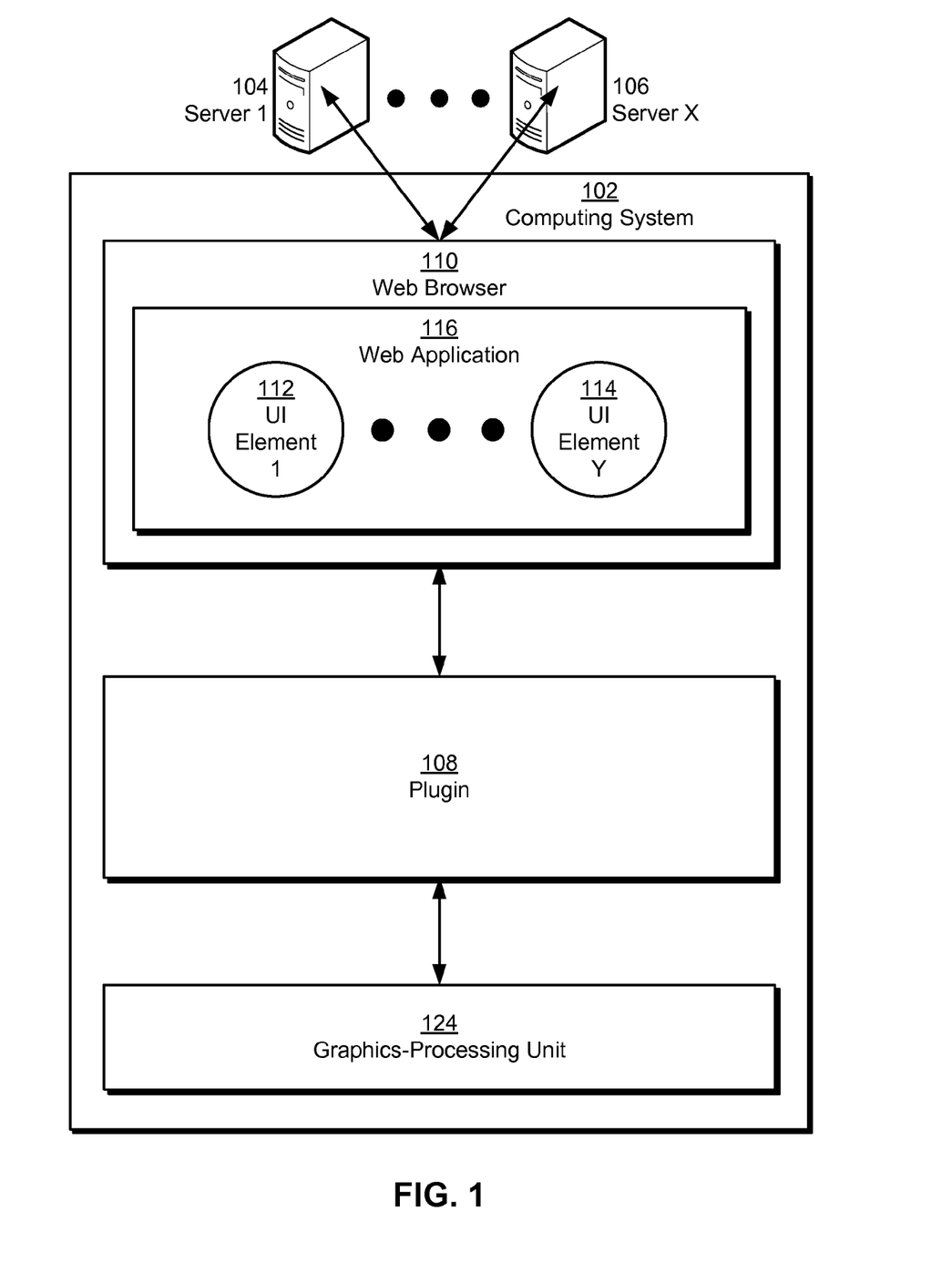
FIG. 1 shows a schematic of an embodiment of a system.

FIG. 1 shows a schematic of an embodiment of a system. The system includes a computing system 102 and a set of servers (e.g., server 1 104, server x 106). Computing system 102 includes a web application 116 running within a web browser 110 and a plugin 108. Each of these components is described in further detail below.

Computing system 102 may correspond to an electronic device that provides one or more services or functions to a user. For example, computing system 102 may operate as a mobile phone, personal computer (PC), global positioning system (GPS) receiver, portable media player, personal digital assistant (PDA), and/or graphing calculator. In addition, computing system 102 may include an operating system (not shown) that coordinates the use of hardware and software resources on computing system 102, as well as one or more applications (e.g., web browser 110, web application 116) that perform specialized tasks for the user. For example, computing system 102 may include applications such as an email client, address book, document editor, web browser 110, and/or media player. To perform tasks for the user, applications may obtain the use of hardware resources (e.g., processor, memory, I/O components, wireless transmitter, etc.) on computing system 102 from the operating system, as well as interact with the user through a hardware and/or software framework provided by the operating system, as described below.

Those skilled in the art will appreciate that computing system 102 may include functionality to execute both native applications and non-native applications. In other words, computing system 102 may include native applications, such as web browser 110, that are locally installed on computing system 102 and specific to the operating system and/or one or more hardware devices on computing system 102. Such applications may be compiled into native (e.g., machine) code that executes directly on one or more central processing units (CPUs) of computing system 102. Code execution for such applications may further be optimized by writing the applications in a combination of general-purpose programming languages (e.g., C, C++, etc.) and assembly language, as well as utilizing libraries that provide hardware acceleration (e.g., graphics hardware acceleration) to the applications. However, the installation of native applications may compromise the security of computing system 102 and private data stored on computing system 102.

Computing system 102 may also include functionality to execute platform independent, non-native applications. In particular, computing system 102 may obtain web application 116 from one or more servers (e.g., server 1 104, server x 106) using a network connection with the server(s) and load web application 116 in web browser 110. For example, web application 116 may be downloaded from an application server over the Internet by web browser 110.

Once loaded, web application 116 may provide features and user interactivity comparable to that of native applications on computing system 102. For example, web application 116 may function as an email client, document editor, media player, computer-aided design (CAD) system, and/or computer game. Web application 116 may also include dynamic user interface (UI) elements such as menus, buttons, windows, sub-windows, text, textboxes, form fields, icons, toolbars, checkboxes, radio buttons, scrollbars, and/or other graphical objects that emulate analogous UI elements in native applications. In other words, web application 116 may correspond to a rich Internet application (RIA).

Furthermore, web application 116 may execute on computing system 102 regardless of the type of platform (e.g., operating system, drivers, etc.) associated with computing system 102. Though platform-independent applications such as web application 116 may be more portable and secure than native applications, such cross-platform applications may lack certain performance capabilities of native applications.

More specifically, non-native applications such as web application 116 may be written using scripting languages that are interpreted rather than compiled, such as Javascript (Javascript™ is a registered trademark of Sun Microsystems, Inc.). The interpreted nature of web application 116 and/or other non-native applications may result in significantly slower execution times for the non-native applications than those of compiled native applications. Non-native applications may also be unable to utilize low-level libraries and/or application programming interfaces (API) that are available for use by native applications. Consequently, non-native applications may provide limited functionality in certain tasks.

In particular, web application 116 may be unable to utilize graphics hardware acceleration (e.g., from graphics-processing unit (GPU) 124) in graphics rendering. For example, web application 116 may be written in a language (e.g., Javascript) that lacks an interface with GPU 124. Instead, graphics rendering for web application 116 may be performed using software that executes on a CPU of computing system 102 rather than GPU 124. As a result, graphics in web application 116 may be suboptimal compared to graphics in native applications that employ graphics hardware acceleration.

Limitations in graphics rendering for web application 116 may further preclude web application 116 from providing features that utilize significant graphics processing resources, including graphics hardware acceleration. In one or more embodiments of the invention, these features are associated with hardware-accelerated rendering of UI elements (e.g., UI element 112, UI element 114). These features include, but are not limited to:

- Two-dimensional (2D) and three-dimensional (3D) UI elements
- Anti-aliasing
- Vector graphics
- Overlay of 2D content on 3D surfaces
- Animation
- Geometric transformations
- Hardware-accelerated text rendering In other words, web application 116 may be unable to efficiently implement features that require computationally intensive (e.g., hardware-accelerated) rendering of graphics because of the inability to access GPU 124 from web application 116.

To enable graphics support and graphics hardware acceleration for platform-independent web applications, operations related to graphics processing may be offloaded to a plugin 108 in computing system 102. Plugin 108 may expose the capabilities of GPU 124 to web application 116, thus allowing web application 116 to utilize graphics hardware acceleration, including the application of vertex and pixel shaders. Plugin-based graphics hardware acceleration for web applications is described in a co-pending non-provisional application by inventors Robin Green, Evangelos Kokkevis, Matthew Papakipos and Gregg Tavares and filed 16 Jul. 2008 entitled, "WEB-BASED GRAPHICS RENDERING SYSTEM," having Ser. No. 12/174,586, which is incorporated herein by reference.

To render UI elements for web application 116, plugin 108 may obtain rendering requests for the UI elements from web application. Plugin may generate a GPU command stream corresponding to each UI element based on the rendering request for that UI element and send the GPU command stream to GPU 124. GPU 124 may then render the UI element by executing the GPU command stream. Finally, the UI element may be displayed within web browser 110 for use by web application 116. For example, the UI element may be a 3D scrollbar that allows the user to scroll within web application 116 along multiple dimensions. 3D scrollbars for web application 116 are discussed in further detail below with respect to FIGS. 3A-3C.

Because UI elements in web application 116 may be used to facilitate interaction with the user, the UI elements may periodically require re-rendering. In particular, the UI elements may be re-rendered to animate, transform, and/or change the dimensionality of the UI elements. For example, a button may be animated upon selection of the button by the user within web application 116. In addition, a cursor may be translated across web application 116 in response to user input through a pointing device such as a mouse, trackball, touchpad, and/or touchscreen. Moreover, a 2D icon may change appearance to become a 3D icon if the cursor passes over the icon.

To re-render a UI element, web application 116 may update the rendering request for the UI element. Plugin 108 may receive the updated rendering request and update the GPU command stream for the UI element based on the updated rendering request. The updated GPU command stream may then be sent by plugin 108 to GPU 124 and executed by GPU 124 to re-render the UI element.

In one or more embodiments of the invention, plugin 108 provides hardware-accelerated graphics to web application 116 using a variety of components. These components may include a scenegraph renderer, a command buffer, a native code module, a trusted code module, and/or a rendering engine. In addition, the components may be implemented and/or combined in multiple ways to execute the functionality of plugin 108.

In particular, plugin 108 may implement a scenegraph renderer within a safely executing native code module. The native code module may be executed within a secure runtime environment and validated prior to execution in the secure runtime environment. Native code module validation is described in a co-pending non-provisional application by inventors J. Bradley Chen, Matthew T. Harren, Matthew Papakipos, David C. Sehr, and Bennet S. Yee, entitled, "Method for Validating an Untrusted Native Code Module," having Ser. No. 12/117,634, and filing date 8 May 2008, which is incorporated herein by reference. Native code execution in a secure runtime environment is described in a co-pending non-provisional application by inventors J. Bradley Chen, Matthew T. Harren, Matthew Papakipos, David C. Sehr, Bennet S. Yee, and Gregory Dardyk, entitled, "Method for Safely Executing an Untrusted Native Code Module on a Computing Device," having Ser. No. 12/117,650, and filing date 8 May 2008, which is incorporated herein by reference.

To render graphics for web application 116, the native code module may interact with a trusted code module that executes outside the secure runtime environment. In addition, the interaction between the native code module and the trusted code module may be facilitated by a command buffer. Graphics rendering for web applications using native code modules and trusted code modules is described in a co-pending non-provisional application by inventors Antoine Labour and Matthew Papakipos and filed on the same day as the instant application entitled, "Hardware-Accelerated Graphics for Web Applications Using Native Code Modules," having Ser. No. 12/267,095, and filing date 7 Nov. 2008, which is incorporated herein by reference. Secure web-based graphics rendering using command buffers is described in a co-pending non-provisional application by inventor Antoine Labour and filed on the same day as the instant application entitled, "COMMAND BUFFERS FOR WEB-BASED GRAPHICS RENDERING," having Ser. No. 12/267,125, and filing date 7 Nov. 2008, which is incorporated herein by reference.

Finally, plugin 108 may communicate with GPU 124 by interfacing with a rendering engine, such as a Direct3D (Direct3D™ is a registered trademark of Microsoft Corp.) or OpenGL (OpenGL™ is a registered trademark of Silicon Graphics, Inc.) renderer. Alternatively, plugin 108 may send the GPU command stream to GPU 124 using a direct interface with GPU 124.

In one or more embodiments of the invention, web application 116 is implemented using a scripting language (e.g., Javascript) and/or a native code module. Interaction between plugin 108 and web applications that use scripting languages and/or native code modules is described above and in the above-referenced applications.

Figure 2:
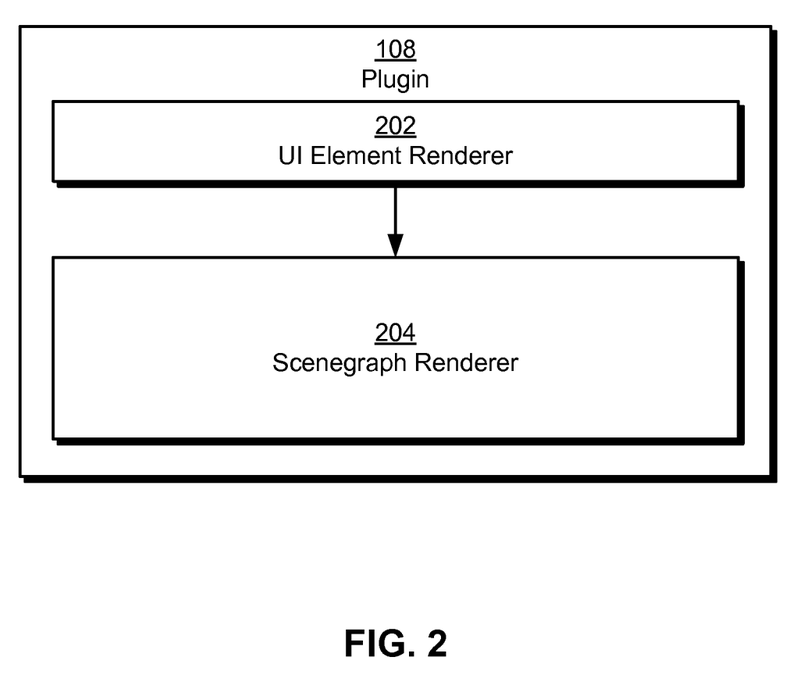
FIG. 2 shows a plugin in accordance with an embodiment of the system.

FIG. 2 shows plugin 108 in accordance with an embodiment of the system. Plugin 108 includes a UI element renderer 202 and a scenegraph renderer 204. As described above, scenegraph renderer 204 may be implemented by plugin using a variety of components and/or interfaces. UI element renderer 202 is implemented on top of scenegraph renderer 204. Furthermore, UI element renderer 202 may allow plugin 108 to render UI elements for a web application, such as web application 116 of FIG. 1.

In particular, UI element renderer 202 may include graphics models for a variety of UI elements, including scrollbars, textboxes, text, buttons, checkboxes, radio buttons, menus, windows, icons, cursors, form fields, and/or toolbars. Upon receiving a rendering request for a particular UI element, UI element renderer 202 may send the graphics model for the UI element along with a set of parameters (e.g., colors, sizes, angles, behavior, etc.) provided by the web application to scenegraph renderer 204. Scenegraph renderer 204 may then render the UI element by executing a graphics pipeline for rendering the graphics model. For example, scenegraph renderer 204 may generate GPU commands that perform modeling, viewing, and projection transformations on objects within the graphics model; clipping and culling of geometric primitives; vertex shading, rasterization, and interpolation; and texturing and fragment shading.

To render multiple UI elements, scenegraph renderer 204 may store the graphics models for the UI elements in a scenegraph. Scenegraph renderer 204 may then create a render graph from the scenegraph and render the UI elements by traversing the render graph. The order of traversal within the render graph may allow UI elements and/or other graphical components in the web application to be rendered correctly. For example, the render graph may implement z-order rendering to overlay 2D UI elements on top of 3D objects in a computer game.

Figure 3A:
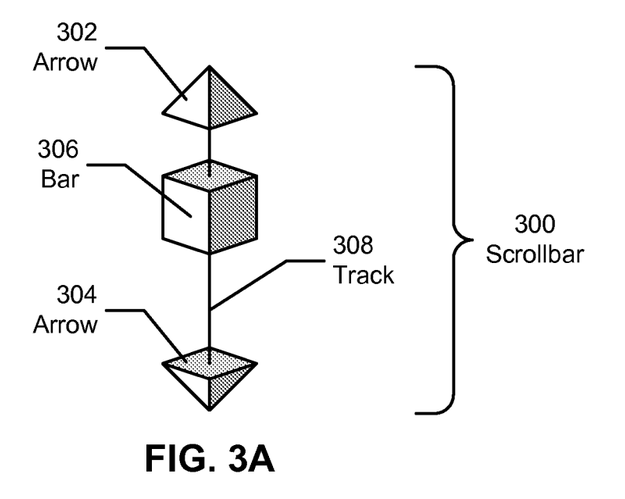
FIG. 3A shows an exemplary scrollbar.

FIG. 3A shows an exemplary scrollbar 300. Scrollbar 300 may correspond to a 3D scrollbar that is rendered for a web application, such as web application 116 of FIG. 1. Furthermore, scrollbar 300 may be rendered by a plugin (e.g., plugin 108) that enables hardware graphics acceleration for the web application. As a result, scrollbar 300 may include a number of attributes that may be unavailable in most web applications, such as vector graphics, anti-aliasing, animation, and/or geometric transformations.

As shown in FIG. 3A, scrollbar 300 includes two arrows 302-304, a bar 306, and a track 308. Bar 306 may be moved between arrows 302-304 along track 308. In addition, the movement of bar 306 along track 308 may allow scrolling to occur along the axis indicated by track 308. For example, bar 306 may be moved by a cursor, directional keypad, and/or other input mechanism to scroll across a scene in a 3D computer game. Based on the orientation of scrollbar 300 in FIG. 3A, the scrolling movement may correspond to a vertical movement within the 3D computer game.

Scrollbar 300 may also include other attributes that may be enabled using graphics hardware acceleration. For example, scrollbar 300 may be rotated around track 308, resized (e.g., by dragging arrow 302 or arrow 304), and/or animated based on user input.

Figure 3B:
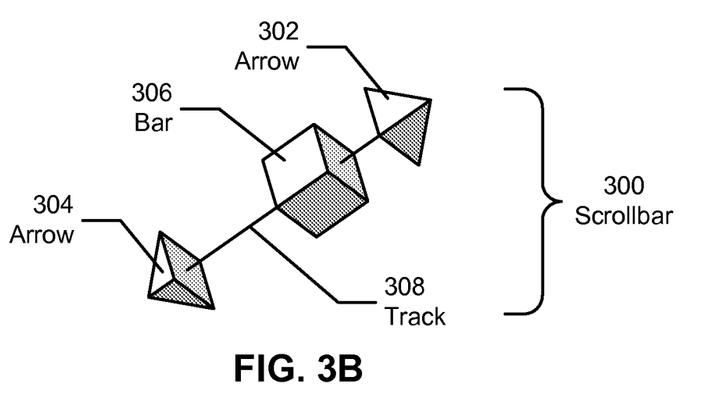
FIG. 3B shows an exemplary scrollbar.

FIG. 3B shows scrollbar 300 after scrollbar 300 is rotated. The rotation of scrollbar 300 may be made in response to user input, such as dragging of arrow 302 or arrow 304 by a cursor. As a result, scrollbar 300 is shown rotated at an angle from the vertical position shown in FIG. 3A.

Furthermore, the rotation of scrollbar 300 may affect the scrolling behavior associated with scrollbar 300. For example, instead of scrolling in a vertical motion, scrollbar 300 may now allow scrolling at an angle to vertical. More specifically, scrollbar 300 may allow scrolling along the axis that defines the angle to which scrollbar 300 is rotated from the position shown in FIG. 3A.

Figure 3C:
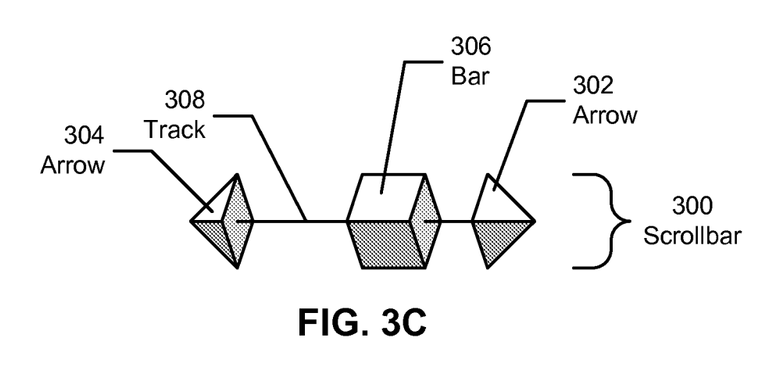
FIG. 3C shows an exemplary scrollbar.

FIG. 3C shows scrollbar 300 after an additional rotation of scrollbar 300 is made from the angled position of FIG. 3B. In other words, scrollbar 300 is now orientated horizontally. Furthermore, scrollbar 300 may now enable scrolling along the horizontal axis indicated by track 308. As a result, scrollbar 300 in FIG. 3C may allow scrolling to occur in a direction that is orthogonal to the scrolling direction of scrollbar 300 in FIG. 3A.

Figure 4:
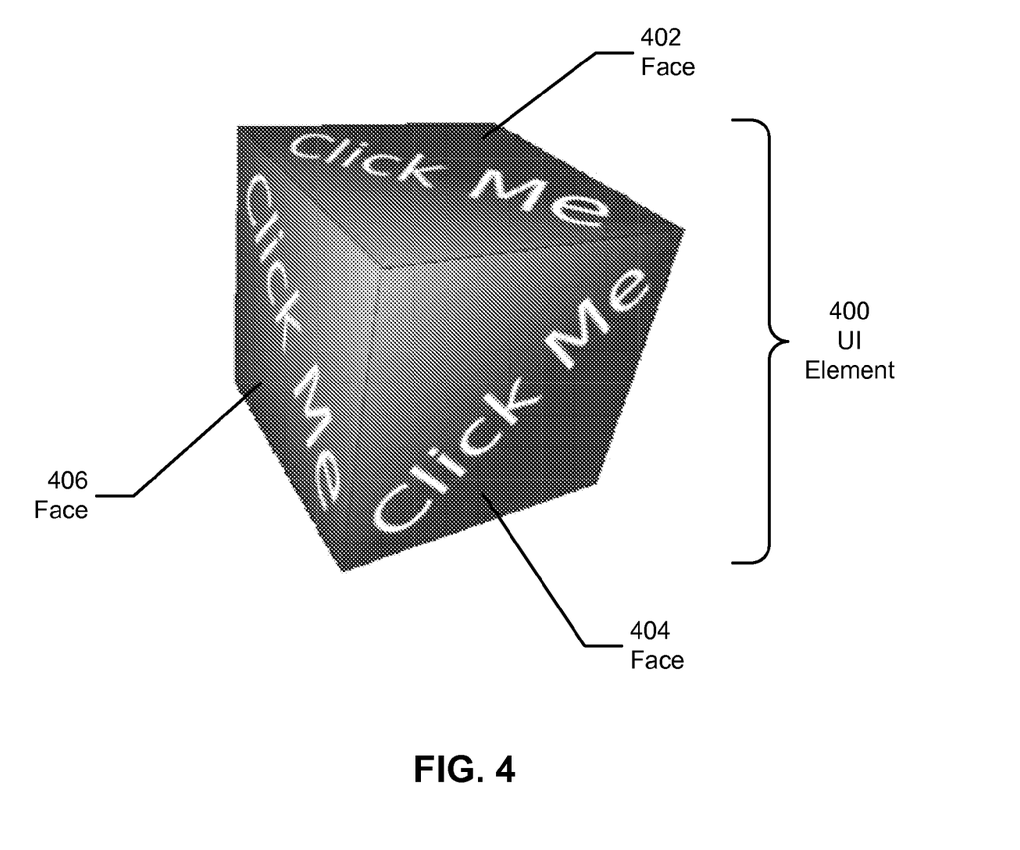
FIG. 4 shows an exemplary user interface element.

FIG. 4 shows an exemplary UI element 400. UI element 400 may be included in a web application to facilitate user interaction with the web application. In addition, UI element 400 may be rendered for a web application by a GPU. In particular, UI element 400 corresponds to a 3D cube with three visible faces 402-406. Each face 402-406 includes text (e.g., "Click Me") that is mapped to the surface of the face. Furthermore, geometric transformations (e.g., rotations, translations, scalings, etc.) to UI element 400 may also be preserved in the text on faces 402-406.

UI element 400 may interact with the user in a variety of ways. For example, UI element 400 may correspond to a button, icon, menu, and/or toolbar that accepts input from the user. Input to UI element 400 may also trigger the web application to perform one or more tasks for the user, re-render UI element 400, and/or execute other actions. For example, clicking on faces 402-406 may cause a different feature of the web application to be provided to the user. Rotating UI element 400 may also expose other faces of the cube to the user for interaction with the user. Other combinations of user input may also animate UI element 400. For example, UI element 400 may animate into a jack-in-the-box if the user clicks the right face (e.g., faces 402-406) of the cube. Finally, UI element 400 may change dimensionality. In other words, UI element 400 may transition from a 3D button to a 2D button that implements the functionality of one of the faces (e.g., faces 402-406).

Figure 5A:
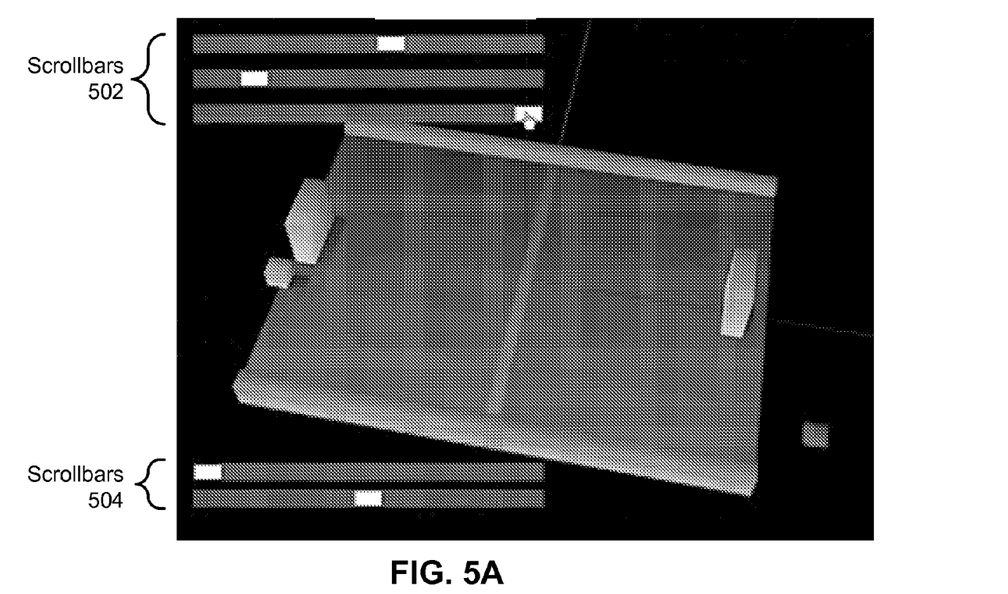
FIG. 5A shows an exemplary screenshot.

FIG. 5A shows an exemplary screenshot. More specifically, FIG. 5A shows an exemplary user interface that includes 2D content overlaid on 3D surfaces. As shown in FIG. 5A, two sets of scrollbars 502-504 are rendered as 2D user interface elements overlaid on a 3D game. The 3D game may be executed as a web application that utilizes hardware graphics acceleration. Scrollbars 502-504 may also be rendered using graphics hardware acceleration and allow a user of the web application (e.g., a player of the game) to change the perspective of the game, as described below with respect to FIG. 5B.

Figure 5B:
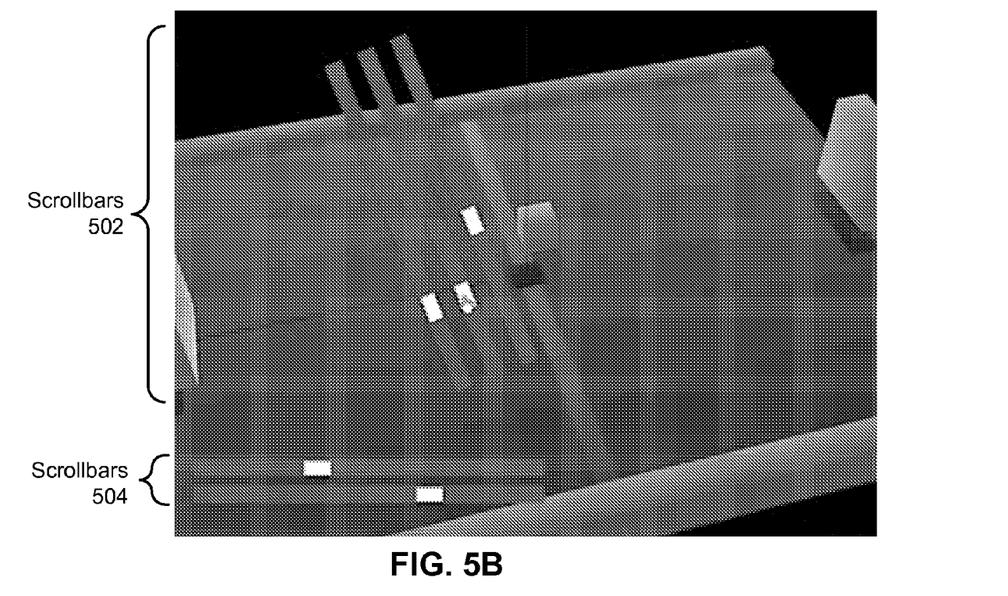
FIG. 5B shows an exemplary screenshot.

FIG. 5B shows an exemplary screenshot. In particular, FIG. 5B shows the user interface of FIG. 5A after scrollbars 502-504 have been used to adjust the perspective of the 3D game. For example, scrollbars 502 may be used to rotate the game along three different axes (e.g., coordinate axes). As shown in FIG. 5B, scrollbars 502 may also be rotated to change the axes of rotation in the 3D game. Similarly, scrollbars 504 may be used to zoom or translate the 3D objects in the 3D game. Consequently, adjustments to scrollbars 502-504 may produce different views of the 3D game, as depicted in FIGS. 5A-5B.

Figure 6:
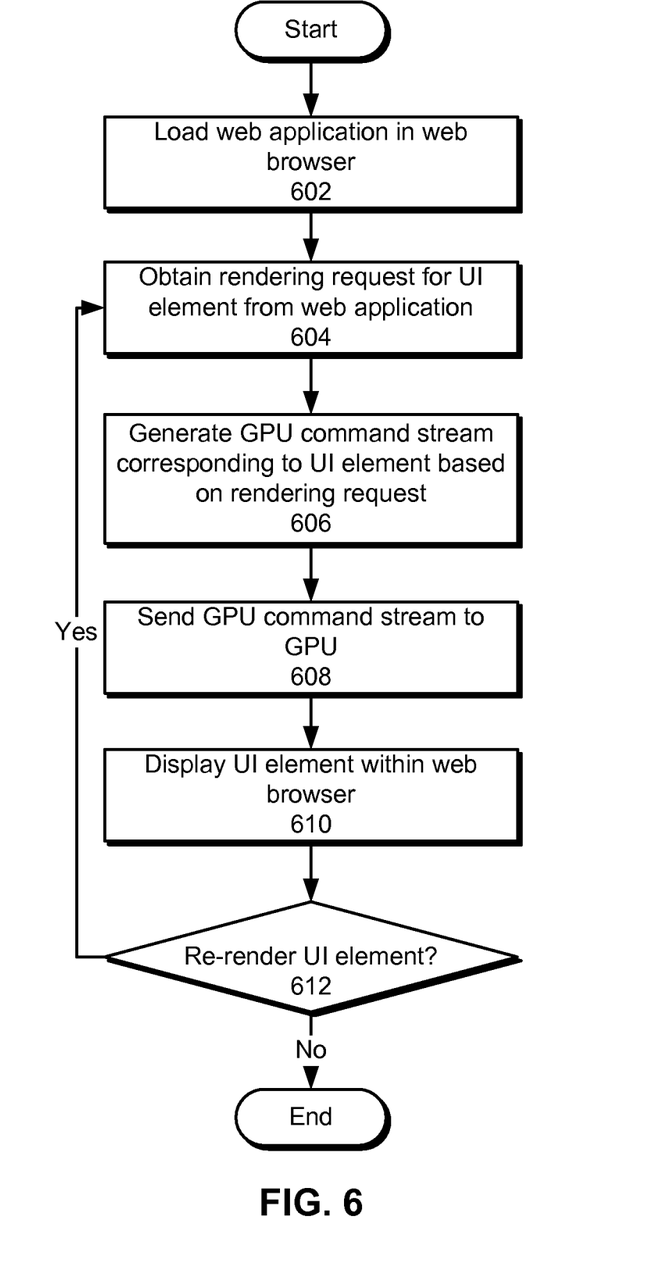
FIG. 6 shows a flowchart illustrating the process of rendering a user interface element for a web application.

FIG. 6 shows a flowchart illustrating the process of rendering a UI element for a web application. In one or more embodiments, one or more of the steps may be omitted, repeated, and/or performed in a different order. Accordingly, the specific arrangement of steps shown in FIG. 6 should not be construed as limiting the scope of the technique.

First, the web application is loaded into a web browser (operation 602). The web application may be obtained from a server by the web browser. The web application may also utilize graphics hardware acceleration in performing tasks for a user. In particular, the web application may use graphics hardware acceleration to render UI elements such as scrollbars, textboxes, text, buttons, checkboxes, radio buttons, menus, windows, icons, cursors, form fields, and/or toolbars.

To render a UI element, a rendering request for the UI element is obtained from the web application (operation 604). The rendering request may specify the UI element to be rendered, as well as a set of parameters with which the UI element is to be rendered. Next, a GPU command stream corresponding to the UI element is generated based on the rendering request (operation 606). For example, the GPU command stream may be generated for a scrollbar based on an angle obtained from the rendering request that describes the scrollbar's orientation.

The GPU command stream is then sent to a GPU (operation 608), which renders the UI element by executing the GPU command stream. The UI element may also be displayed within the web browser (operation 610) to facilitate user interaction with the web application.

The UI element may also be re-rendered (operation 612). In particular, the UI element may be re-rendered in response to user input. The UI element may also be re-rendered to transform, animate, and/or change the dimensionality of the UI element. If the UI element is to be re-rendered, an updated rendering request for the UI element is obtained from the web application (operation 604) and an updated GPU command stream is generated based on the updated rendering request (operation 606). The updated GPU command stream is sent to the GPU for execution of the updated GPU command stream (operation 608), and the re-rendered UI element is displayed within the web browser (operation 610). The UI element may thus be repeatedly rendered until the UI element is no longer used by the web application.

The foregoing descriptions of embodiments have been presented only for purposes of illustration and description. They are not intended to be exhaustive or to limit the embodiments to the forms disclosed. Accordingly, many modifications and variations will be apparent to practitioners skilled in the art. Additionally, the above disclosure is not intended to limit the present invention. The scope of the present embodiments is defined by the appended claims.

What is claimed is:

1. A method comprising:
loading a web application in a web browser;
responsive to loading the web application, retrieving, by the web browser and over a network, a plugin from a remote server;
obtaining a rendering request for a user interface (UI) element from the web application;
generating, by a native code module of the plugin retrieved over the network from the remote server, a graphics-processing unit (GPU) command stream corresponding to the UI element based on the rendering request, wherein the native code module executes in a secure runtime environment;
sending, by the native code module of the plugin, the GPU command stream to a trusted code module of the plugin that executes outside of the secure runtime environment; and
providing, by the trusted code module, the GPU command stream to the GPU.

2. The method of claim 1, further comprising:
displaying the UI element within the web browser.

3. The method of claim 1, further comprising:
obtaining an updated rendering request for the UI element from the web application;
updating the GPU command stream based on the updated rendering request; and
sending the updated GPU command stream to the GPU, wherein the UI element is re-rendered by the GPU.

4. The method of claim 3, wherein the UI element is re-rendered to:
animate the UI element;
transform the UI element; or
change a dimensionality of the UI element.

5. The method of claim 1, wherein the plugin is configured to generate the GPU command stream using at least one of a scenegraph renderer, a command buffer, a native code module, a trusted code module, and a rendering engine.

6. The method of claim 1, wherein the UI element is at least one of a scrollbar, a textbox, text, a button, a checkbox, a radio button, a menu, a window, an icon, a cursor, a form field, and a toolbar.

7. The method of claim 1, further comprising implementing the web application using at least one of a scripting language and a native code module.

8. The method of claim 1, wherein a network identifier for retrieving the plugin is provided by the web application to the web browser, upon loading the web application.

9. The method of claim 1, wherein only a portion of the plugin is retrieved over the network from the remote server, the portion of the plugin comprising a native code module that executes in a secure runtime environment of the plugin, the native code module being platform independent.

10. The method of claim 1, further comprising:
obtaining another rendering request for a plurality of UI elements, at least one of the plurality of UI elements comprising a two-dimensional UI element and at least one of the plurality of UI elements comprising a three-dimensional UI element;
determining a rendering order of the plurality of UI elements based at least in part on a placement of the two-dimensional UI element and the three-dimensional UI element;
generating another GPU command stream based at least in part on the rendering order; and
sending the another GPU command stream to the GPU.

11. The method of claim 10, wherein the rendering order comprises a z-order and the two-dimensional UI element is rendered by the GPU as overlaid on top of the three-dimensional UI element.

12. A system comprising:
a plugin associated with a web browser in a computing system; and
a web application configured to execute in the web browser and to retrieve at least a portion of the plugin from a server over a network;
wherein the web application is configured to make a rendering request for a user interface (UI) element, and
wherein the plugin is configured to:
  generate, by a native code module of the plugin that executes in a secure runtime environment, a graphics-processing unit (GPU) command stream corresponding to the UI element based on the rendering request,
  send, by the native code module of the plugin, the GPU command stream to a trusted code module of the plugin that executes outside of the secure runtime environment, and
  send, by the trusted code module of the plugin, the GPU command stream to a GPU, wherein the UI element is rendered by the GPU.

13. The system of claim 12, wherein an image is displayed within the web browser.

14. The system of claim 12,
wherein the web application is further configured to update the rendering request based on input from a user of the web application, and
wherein the plugin is further configured to:
update the GPU command stream based on the updated rendering request; and
send the updated GPU command stream to the GPU, wherein the UI element is re-rendered by the GPU.

15. The system of claim 14, wherein the UI element is re-rendered to:
animate the UI element;
transform the UI element; or
change a dimensionality of the UI element.

16. The system of claim 12, wherein the plugin is further configured to generate the GPU command stream using at least one of a scenegraph renderer, a command buffer, or a rendering engine.

17. The system of claim 12, wherein the UI element is at least one of a scrollbar, a textbox, text, a button, a checkbox, a radio button, a menu, a window, an icon, a cursor, a form field, and a toolbar.

18. The system of claim 12, wherein the web application is implemented using a scripting language and the native code module.

19. A non-transitory computer-readable storage medium storing instructions that when executed by a computer cause the computer to perform a method comprising:
loading a web application in a web browser;
responsive to loading the web application, retrieving, by the web browser, at least a portion of a plugin from a server;
obtaining a rendering request for a plurality of user interface (UI) elements from the web application, the plurality of user interface elements comprising a two-dimensional UI element and a three-dimensional UI element;
determining a rendering order of the plurality of UI elements based at least in part on a placement of the two-dimensional UI element and the three-dimensional UI element;
generating, by the plugin, a graphics-processing unit (GPU) command stream corresponding to the plurality of UI elements based at least in part on the rendering order; and
sending, by the plugin, the GPU command stream to a GPU, wherein the plurality of UI elements are rendered by the GPU.

20. The computer-readable storage medium of claim 19, the method further comprising:
displaying the plurality of UI elements within the web browser.

21. The computer-readable storage medium of claim 19, the method further comprising:
obtaining an updated rendering request for at least one of the plurality UI elements from the web application;
updating the GPU command stream based on the updated rendering request; and
sending the updated GPU command stream to the GPU, wherein the at least one of the plurality of UI elements is re-rendered by the GPU.

22. The computer-readable storage medium of claim 21, wherein the at least one of the plurality of UI elements is re-rendered to:
animate the at least one of the plurality of UI elements;
transform the at least one of the plurality of UI elements; or
change a dimensionality of the at least one of the plurality of UI elements.

23. The computer-readable storage medium of claim 19, wherein the plugin is configured to generate the GPU command stream using at least one of a scenegraph renderer, a command buffer, a native code module, a trusted code module, and a rendering engine.

24. The computer-readable storage medium of claim 19, wherein the two-dimensional UI element is at least one of a scrollbar, a textbox, text, a button, a checkbox, a radio button, a menu, a window, an icon, a cursor, a form field, and a toolbar.

25. The computer-readable storage medium of claim 19, the method further comprising implementing the web application using at least one of a scripting language and a native code module.

* * * * *